(12) United States Patent
Weilbacher et al.

(10) Patent No.: US 10,884,553 B2
(45) Date of Patent: Jan. 5, 2021

(54) LIGHT GUIDE AND TOUCH SCREEN ASSEMBLY

(71) Applicant: Hewlett-Packard Development Company, L.P., Houston, TX (US)

(72) Inventors: Katherine Weilbacher, Singapore (SG); Jeffrey Lueschen, Boise, ID (US); Lawrence J Gutkowski, San Diego, CA (US); Maria Del Carmen Tate, Santee, CA (US); Ethan Bret Nusbaum, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 116 days.

(21) Appl. No.: 15/755,710

(22) PCT Filed: Nov. 3, 2015

(86) PCT No.: PCT/US2015/058803
§ 371 (c)(1),
(2) Date: Feb. 27, 2018

(87) PCT Pub. No.: WO2017/078684
PCT Pub. Date: May 11, 2017

(65) Prior Publication Data
US 2019/0025984 A1    Jan. 24, 2019

(51) Int. Cl.
*G06F 3/042*    (2006.01)
*G02B 6/10*    (2006.01)
*F21V 8/00*    (2006.01)

(52) U.S. Cl.
CPC .......... *G06F 3/0421* (2013.01); *G02B 6/102* (2013.01); *G02B 6/0011* (2013.01)

(58) Field of Classification Search
CPC ...... G02B 6/0011; G02B 6/102; G06F 3/0421
See application file for complete search history.

(56) References Cited

U.S. PATENT DOCUMENTS

| 5,729,250 | A | 3/1998 | Bishop et al. |
| 8,851,985 | B2 | 10/2014 | Rasmussen et al. |
| 8,861,198 | B1 | 10/2014 | Asuncion |
| 8,913,035 | B2 | 12/2014 | Lai et al. |
| 8,963,886 | B2 | 2/2015 | Wassvik |
| 2009/0278795 | A1* | 11/2009 | Hansen ................. G06F 3/0421 345/156 |
| 2010/0238138 | A1 | 9/2010 | Goertz et al. |

(Continued)

FOREIGN PATENT DOCUMENTS

| CN | 103076926 | 5/2013 |
| CN | 203606815 | 5/2014 |

(Continued)

*Primary Examiner* — Insa Sadio
(74) *Attorney, Agent, or Firm* — HP Inc. Patent Department

(57) ABSTRACT

The present disclosure provides a light guide comprising a frame defining a central space, at least first reflective surface formed on a bottom side of the frame and at least second reflective surface formed on a top side of the frame. A light emitted by a light emitting element is capable of being reflected by the at least first reflective surface and the at least second reflective surface to a light receiving element. The present disclosure also provides a touch screen assembly.

18 Claims, 7 Drawing Sheets

(56) References Cited

U.S. PATENT DOCUMENTS

| | | | |
|---|---|---|---|
| 2011/0007033 A1* | 1/2011 | Choi | G02F 1/13338 |
| | | | 345/175 |
| 2011/0242039 A1 | 11/2011 | Kalis et al. | |
| 2012/0249438 A1 | 10/2012 | Kim et al. | |
| 2013/0099675 A1* | 4/2013 | Ma | G06F 3/0428 |
| | | | 315/152 |
| 2014/0192006 A1 | 7/2014 | Rathnam et al. | |
| 2015/0070327 A1 | 3/2015 | Hsieh et al. | |
| 2015/0177906 A1* | 6/2015 | Yairi | G06F 3/016 |
| | | | 345/648 |

FOREIGN PATENT DOCUMENTS

| | | |
|---|---|---|
| EP | 2853997 | 4/2015 |
| TW | 201145115 | 12/2011 |

\* cited by examiner

LIGHT GUIDE AND TOUCH SCREEN ASSEMBLY

BACKGROUND

There are many kinds of touch screen assemblies such as an infrared touch screen assembly, a resistive touch screen assembly, a capacitive touch screen assembly, a surface acoustic wave touch screen assembly, an acoustic pulse recognition touch screen assembly, etc. The infrared touch screen assembly is widely used since it may be touched by an object blocking the infrared light.

Many electrical or electronic apparatus such as a 2D printer, a 3D printer, a mobile phone, a tablet personal computer, etc., comprise a touch screen assembly. The touch screen assembly is a device which is used to determine a certain location to perform a certain function through a finger, a pen or the like touching a character or an icon displayed on a touch panel.

DETAILED DESCRIPTION

As well-known, a touch screen assembly may be used in many electrical or electronic apparatus such as a 2D printer, a 3D printer, a mobile phone or a tablet personal computer. The touch screen assembly usually comprises a plurality of pairs of light emitting elements and light receiving elements, a light guide and a touch panel. Light emitted by the light emitting elements is transmitted over a surface of the touch panel after reflected by the light guide to change its transmitting direction, and then is received by the light receiving elements after reflected by the light guide again to change its transmitting direction. Light transmitted over the surface of the touch panel forms an optical matrix. When the finger, the pen or the like touches the character or the icon displayed on the touch panel, the light at a touch point where the touch panel is touched is blocked. Then, the location of the touch point on the touch panel is identified by a control system comprising a processor.

The light guide of a touch screen assembly usually comprises a lower light guide portion and an upper light guide portion. The lower light guide portion and the upper light guide portion are separate and distinct parts which are individually molded and assembled into the touch screen assembly.

As an example of the present disclosure, the touch screen assembly is an infrared touch screen assembly used as a control panel of a 2D printer. It should be understood that the touch screen assembly according to the present disclosure is not limited to being used as the control panel of the printer, but may be used in various electrical or electronic apparatus. Hereinafter, the example of the present disclosure will be described in detail with reference to the drawings.

Figure 1:
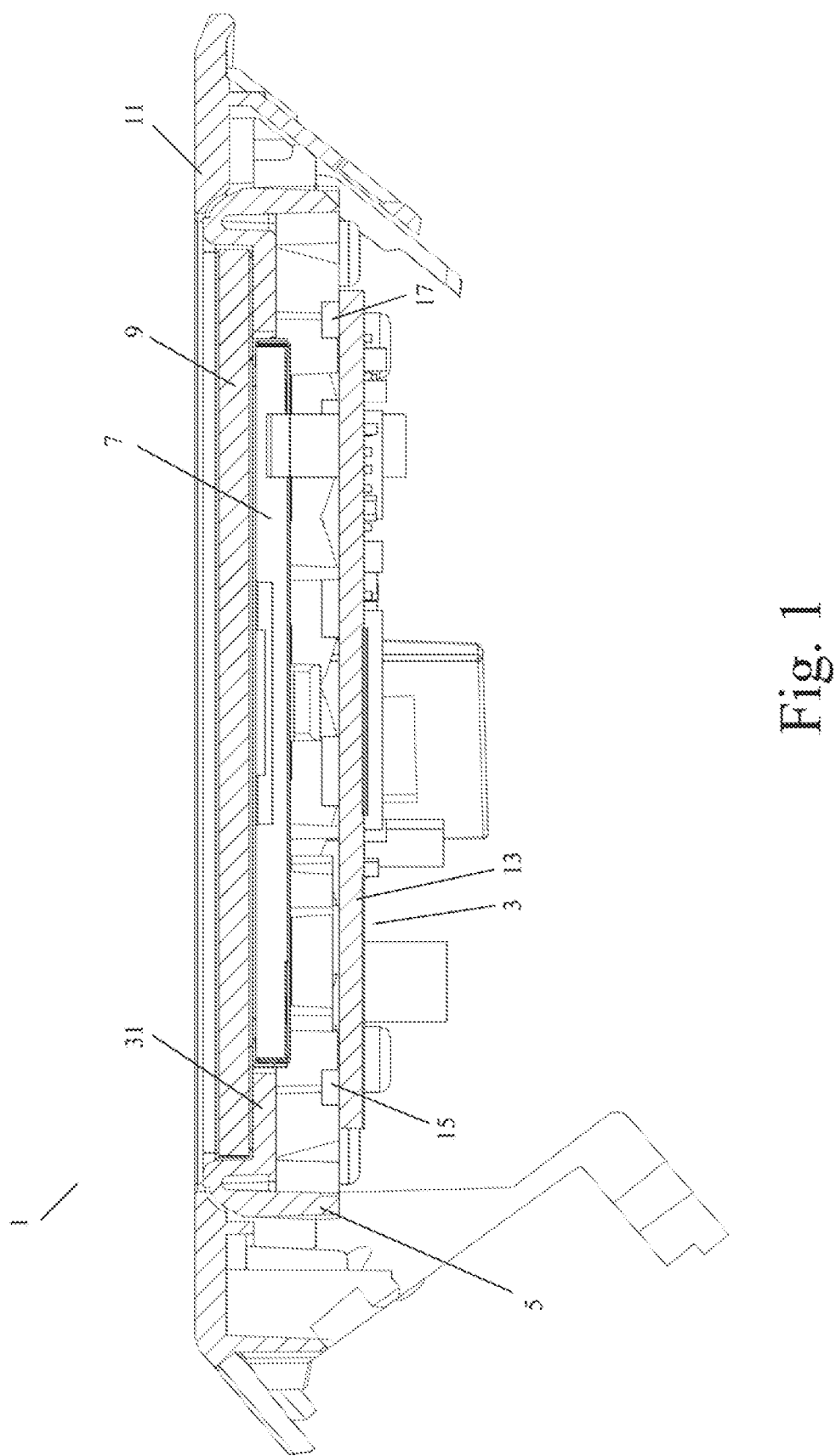
FIG. 1 is a sectional view showing schematically a touch screen assembly according to an example of the present disclosure.
Figure 2:
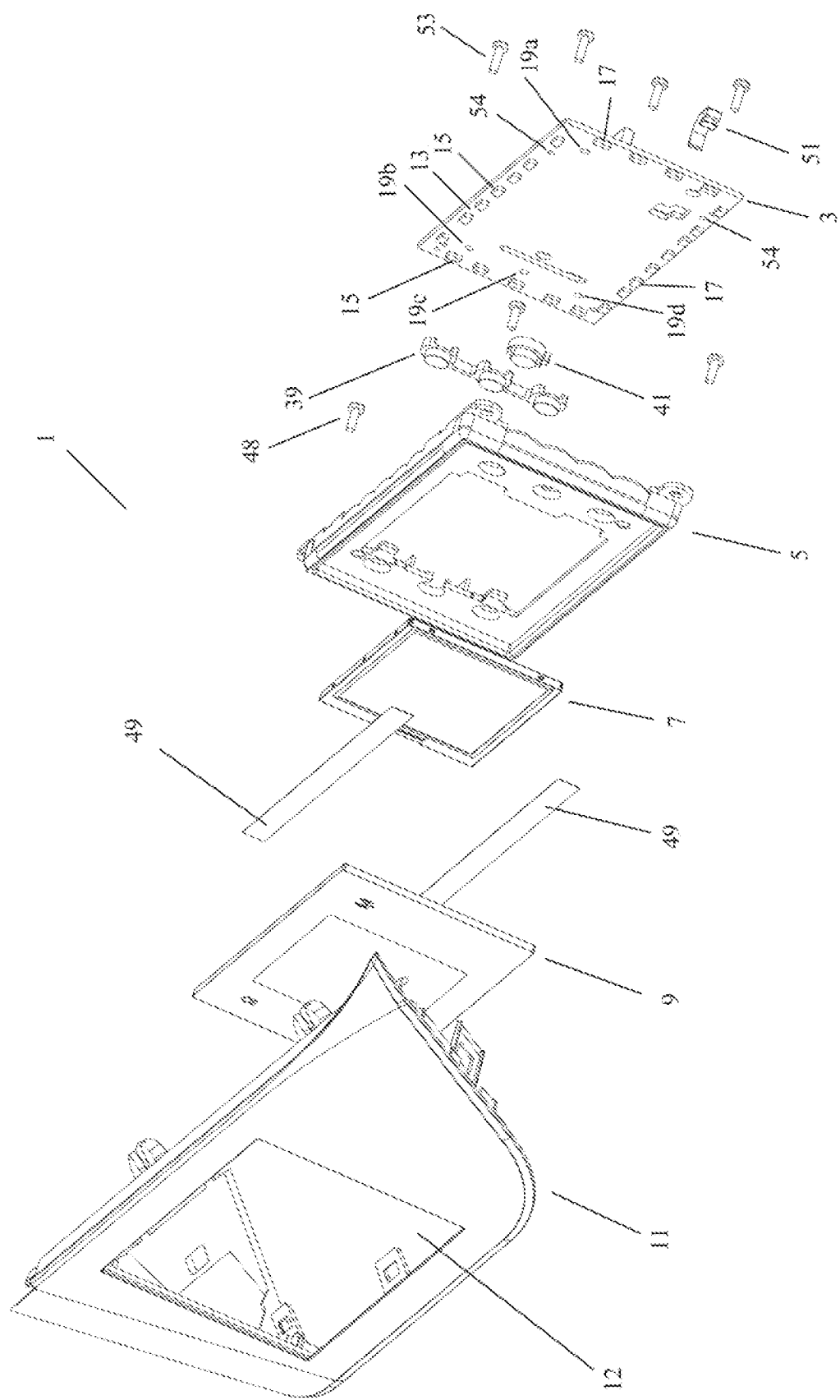
FIG. 2 is an exploded perspective view of the touch screen assembly shown in FIG. 1.

FIG. 1 is a sectional view showing schematically a touch screen assembly 1 according to an example of the present disclosure, and FIG. 2 is an exploded perspective view of the touch screen assembly 1 shown in FIG. 1. As shown in FIGS. 1 and 2, the touch screen assembly 1 according to an example of the present disclosure comprises a printed circuit assembly 3, a light guide 5, a color and graphics display 7, a touch panel 9 and a bezel 11. The printed circuit assembly 3 comprises a printed circuit board 13, a plurality of light emitting elements 15 such as infrared light emitting diodes soldered or plugged onto the printed circuit board 13, and a plurality of light receiving elements 17 such as photodiodes soldered or plugged onto the printed circuit board 13. When the light emitting elements are infrared light emitting diode and the light receiving elements are photodiodes, the touch screen assembly according to the present disclosure is an infrared touch screen assembly. The light emitting elements 15 and the light receiving elements 17 are generally arranged in pairs on the opposite sides of the printed circuit board 13. The printed circuit assembly 3 may further comprise other electrical components soldered or plugged onto the printed circuit board 13 such as a Wifi LED, a "Home" LED, a "Question" LED and a "Back" LED on the bottom side of the printed circuit board 13 (not shown in the drawings). LED (light-emitting diode) is a semiconductor light source which emits light when activated. The printer may use a local area wireless computer networking technology (wifi) that allows the printer to network. A plurality of holes such holes 19a, 19b, 19c, 19d are formed in the printed circuit board 13 to the light emitted by the LEDs to pass through. The light guide 5 transmits the light emitted by the light emitting elements 15 to the light receiving elements 17 by total internal reflection. The color and graphics display 7 displays the characters or the icons indicative of various functions to be performed by the electrical or electronic apparatus. The touch panel 9 is a lens which is to be touched directly by the user to interfere with the light emitted by the light emitting elements 15 and received by the light receiving elements 17. The bezel 11 is a cover that holds the printed circuit assembly 3, the light guide 5, the color and graphics display 7 and the touch panel 9 in place to form the finished touch screen assembly. A central opening 12 is defined in the bezel 11 to expose the touch panel 9.

Figure 3:
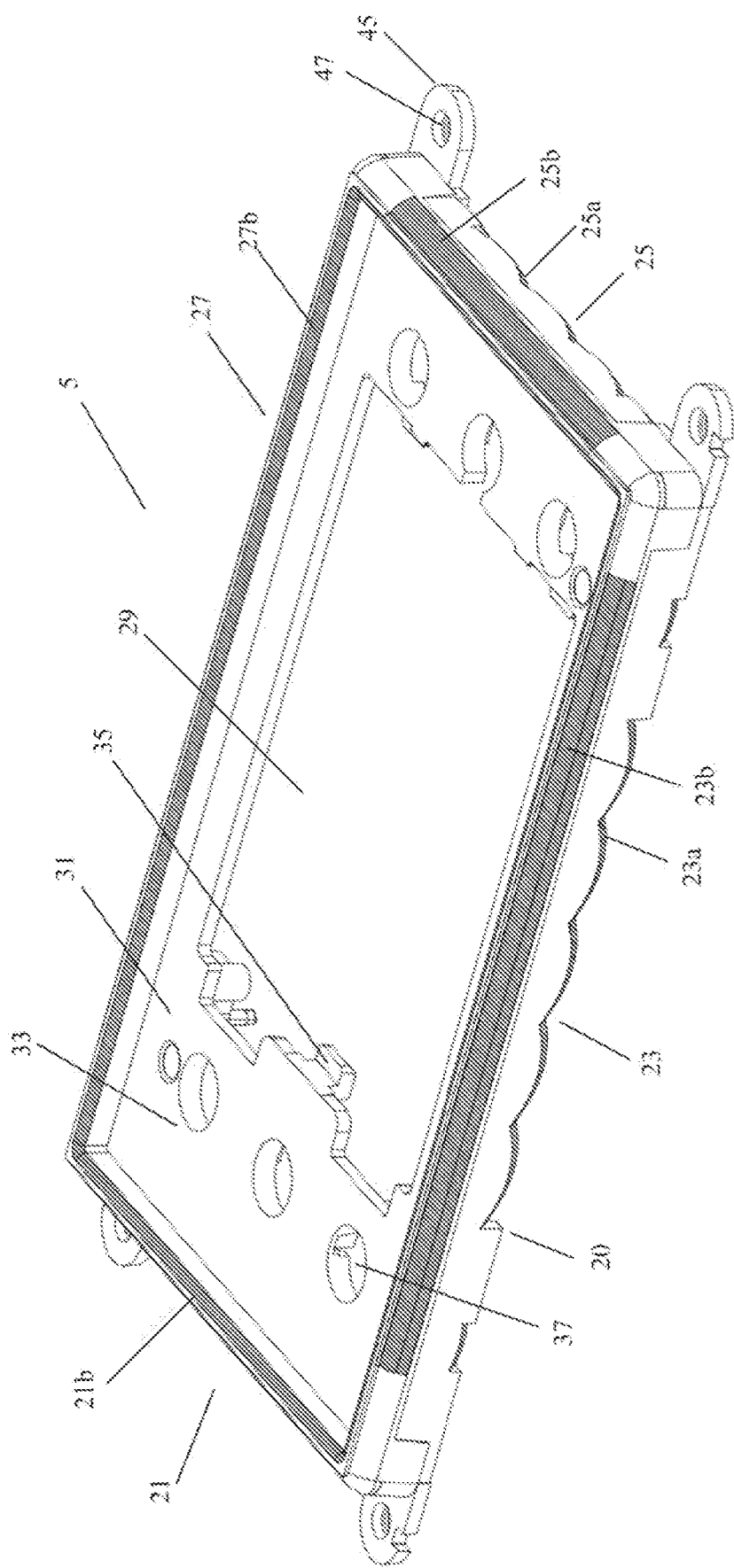
FIG. 3 is a top perspective view of a light guide according to an example of the present disclosure.
Figure 4:
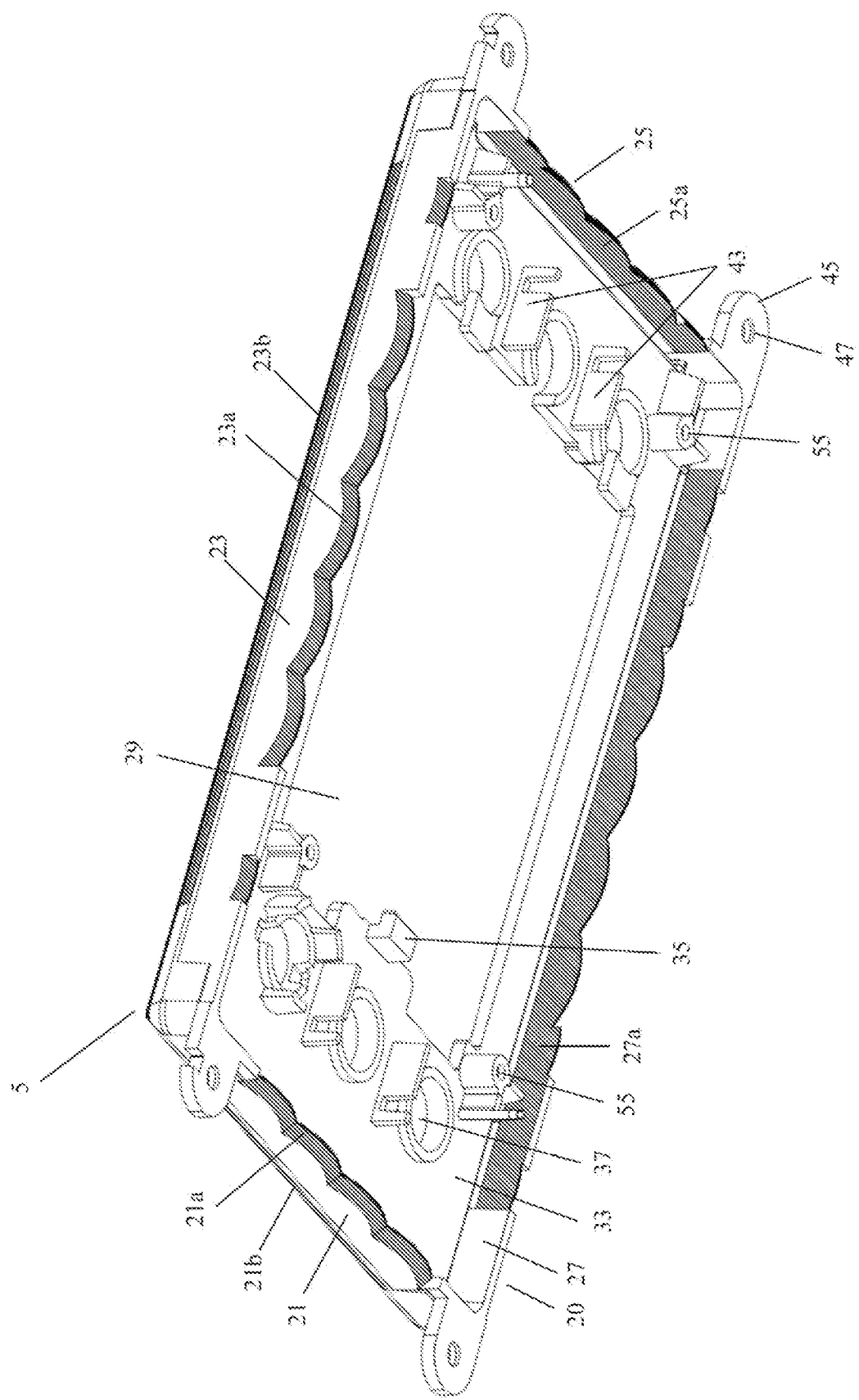
FIG. 4 is a bottom perspective view of the light guide shown in FIG. 3.

FIG. 3 is a top perspective view of a light guide 5 according to an example of the present disclosure and FIG. 4 is a bottom perspective view of the light guide shown in FIG. 3. The light guide 5 according to an example of the present disclosure is a rectangular frame 20 comprising a first light guide member 21, a second light guide member 23, a third light guide member 25 and a fourth light guide member 27 which are in a form of strip, rod or plate. The first light guide members 21, the light guide members second 23, the third light guide members 25 and the fourth light guide members 27 are connected with each other one by one to define a central space 29. It should be understood that the frame 20 of the light guide 5 according to the example of the present disclosure may be in a circular, elliptical, any other polygonal shape. The first light guide members 21, the second light guide members 23, the third light guide members 25 and the fourth light guide members 27 at least comprise a first reflective surface 21a, 23a, 25a, 27a formed on a bottom side of the frame 20 of the light guide 5 and a second reflective surface 21b, 23b, 25b, 27b formed on a top side of the frame 20 of the light guide 5 respectively. In this specification, the top side of the frame 20 refers to a side of the frame 20 which faces the user in an assembled state while the bottom side of the frame 20 is a side opposite to the top side. The first reflective surfaces 21a, 23a, 25a, 27a and the second reflective surface 21b, 23b, 25b, 27b perpendicularly reflect an incoming light relative to an incident direction along which the incoming light is projected onto the first reflective surfaces 21a, 23a, 25a, 27a and the second reflective surface 21b, 23b, 25b, 27b. The first reflective surfaces 21a, 23a, 25a, 27a and the second reflective surface 21b, 23b, 25b, 27b may be a flat surface, a faceted surface or a curved surface such as a parabolic surface, an off-axis parabolic surface or an elliptical surface. In the illustrated example, the first reflective surfaces 21a, 23a, 25a, 27a are shown to be an off-axis parabolic surface while the second reflective surface 21b, 23b, 25b, 27b are to be a parabolic surface. The off-axis parabolic surface serves to collimate the light coming out of the light emitting elements 15 and then refocus the light going into the light receiving elements 17.

The light guide 5 according to an example of the present disclosure may further comprise a projection 31 extending from at least one of the four light guide members toward the central space 29. In the example shown in the drawings, the four light guide members each include the projection 31 to form a support platform 33 for supporting the touch panel 9 thereon. The light guide 5 may further comprise a generally L-shaped arm 35 overhanging from the projection 31 to support the color and graphics display 7 under the touch panel 9. In addition to supporting the touch panel 9 and the color and graphics display 7, the support platform 33 formed by the projections 31 also functions as a stiffener. The stiffener helps to maintain the rigidity of the touch screen assembly to improve the mechanical stability of the touch screen assembly when the user presses on the touch panel 9. A plurality of cavities 37 may be provided at the support platform 33 to receive therein the mechanical components such as a frame light pipe 39 or a wifi light pipe 41. The frame light pipe 39 is a plastic light pipe that is seated above the holes 19b, 19c, 19d in the printed circuit board 13 to direct the light emitted by the "Home" LED, the "Question" LED and the "Back" LED to light up the "Home", "Question" and "Back" marks printed on the touch panel 9. The wifi light pipe 41 is a plastic light pipe that is seated above the hole 19a in the printed circuit board 13 to direct the light emitted by the Wifi LED to light up a wifi icon on the touch panel 9. Some ribs 43 may be formed on the bottom surface of the support platform 33 to hold the mechanical components into the cavities 37 in place and further enhance the rigidity of the touch screen assembly. The light guide 5 may further comprise extensions 45 projecting outwardly at four corners. A threaded hole 47 is provided in each of the extensions. The screws 48 can be screwed into the threaded holes 47 to fix the bezel 11 onto the light guide 5.

The first light guide members 21, the light guide members second 23, the third light guide members 25 and the fourth light guide members 27 are made from a material which can achieve total internal reflection for the incoming light. An example of such a material is polycarbonate and the four light guide members may be molded from polycarbonate, for example by an injection molding process. Although the four light guide members may be separately molded and then assembled together, the frame 20 formed by the four light guide members is shown to be integrally molded as a single piece unit. Although the support platform 33 may be made from a different material from the frame 20, the support platform 33 in the illustrated example is made from the same material as the frame 20 and molded integrally with the frame 20.

The assembly process of the infrared touch screen assembly 1 comprising the light guide 5 according to the example of the present disclosure will be described with reference to FIG. 2. Firstly, the color and graphics display 7 and the touch panel 9 are aligned and adhered to the top surface of the support platform 33 of the light guide 5 by double-sided tapes 49. This assembly is then turned upside down. The light pipes 29 and 41 are assembled into the respective cavities 37. The printed circuit assembly 3 provided with a grounding clip 51 is aligned with the light guide 5 and assembled to the light guide 5 by screws 53 passing through the through holes 54 in the printed circuit board 13 and screwed into the threaded holes 55 in the support platform 33 of the light guide 5. Finally, the bezel 11 is mounted to hold the printed circuit assembly 3, the light guide 5, the color and graphics display 7 and the touch panel 9 in place, thereby forming the finished touch screen assembly.

Figure 5:
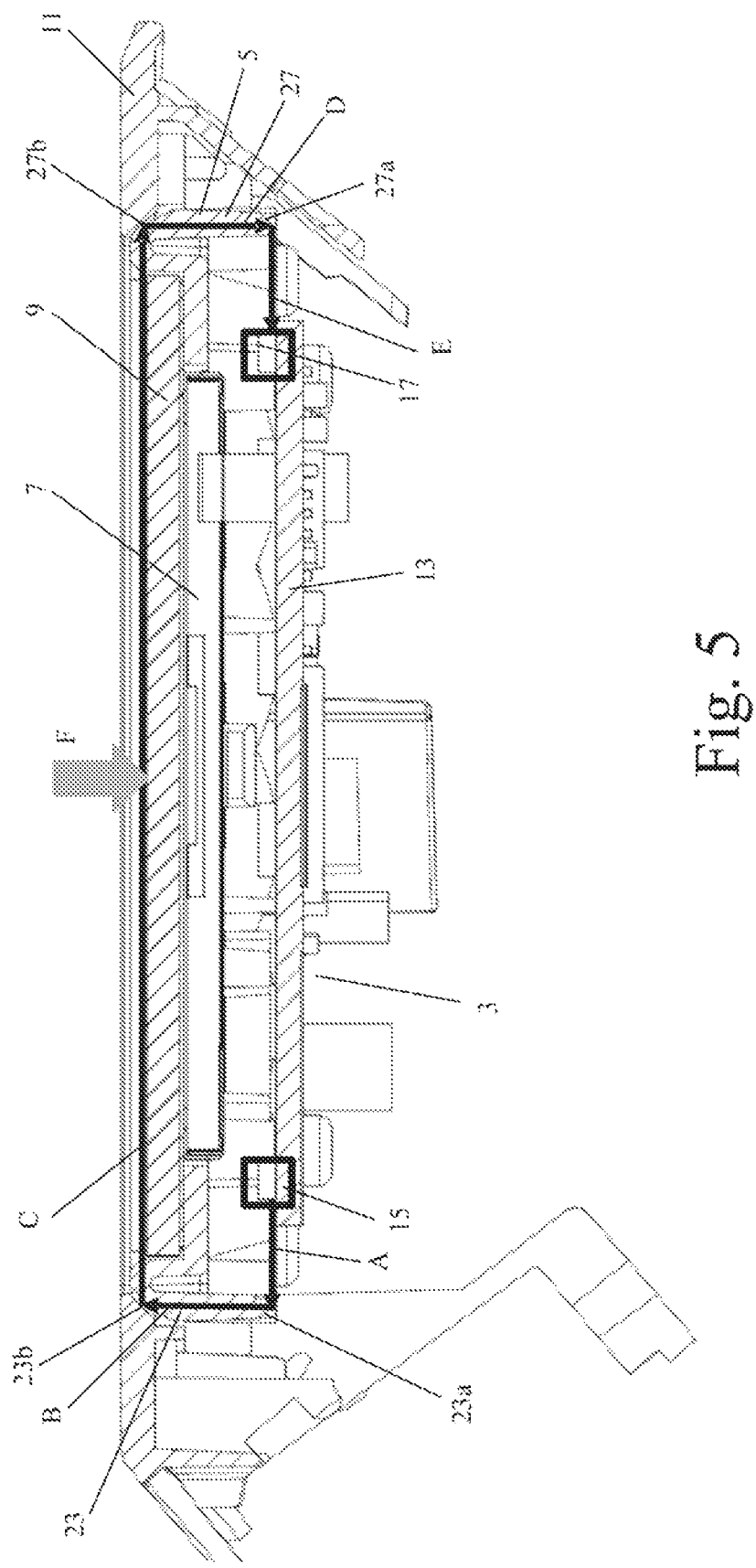
FIG. 5 is a sectional view similar to FIG. 1 showing schematically optical path of the light in the infrared touch screen assembly.
Figure 6:
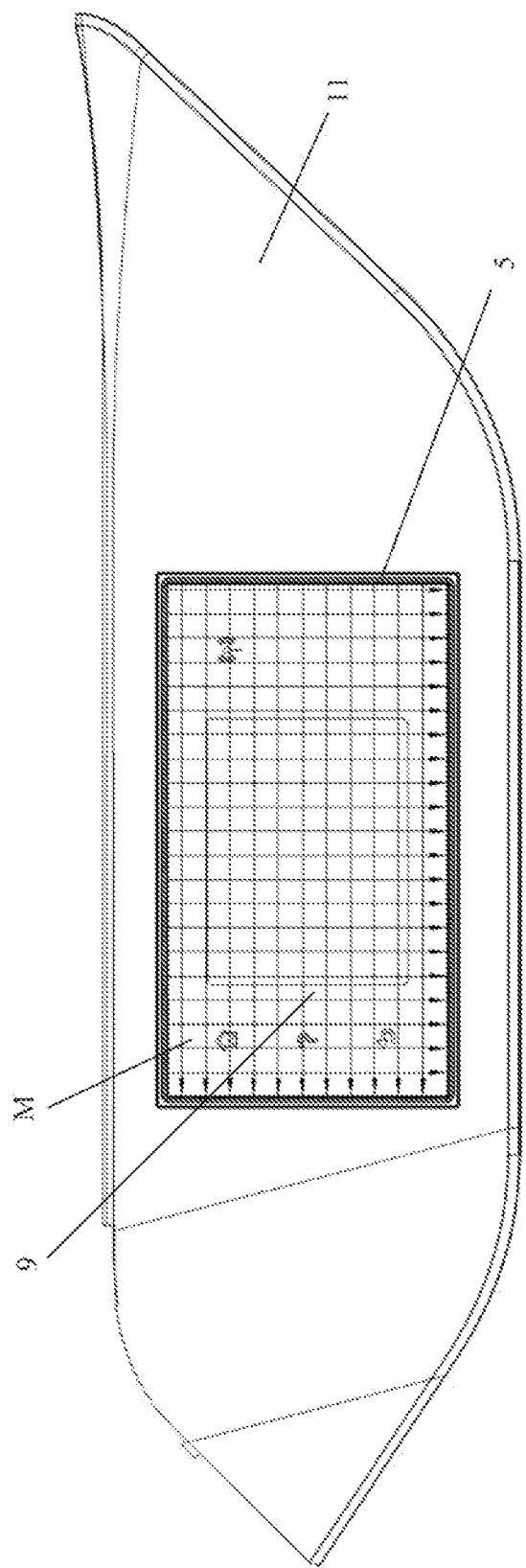
FIG. 6 is a top view of the infrared touch screen assembly shown in FIG. 1 showing schematically an optical matrix formed by the light.

FIG. 5 is a sectional view similar to FIG. 1 showing schematically optical path of the light in the touch screen assembly. FIG. 6 is a top view of the touch screen assembly shown in FIG. 1 showing schematically an optical matrix formed by the light. When the electrical or electronic apparatus comprising the touch screen assembly according to an example of the present disclosure is powered on, the incoming light emitted by the emitting elements 15 is projected onto the first reflective surface 23a of the second light guide member 23 along a direction indicated by an arrow A, reflected perpendicular by the first reflective surface 23a of the second light guide member 23 to the second reflective surface 23b of the second light guide member 23 along a direction indicated by an arrow B, reflected perpendicularly by the second reflective surface 23b of the second light guide member 23 to the second reflective surface 27b of the fourth light guide member 27 along a direction indicated by an arrow C, reflected perpendicularly by the second reflective surface 27b of the fourth light guide member 27 to the first reflective surface 27a of the fourth light guide member 27 along a direction indicated by an arrow D, reflected perpendicularly by the first reflective surface 27a of the fourth light guide member 27 to the light receiving elements 17 along a direction indicated by an arrow E, and received by the light receiving elements 17. Similarly, the incoming light projected onto the first reflective surface 21a of the first light guide member 21 is reflected perpendicularly by the first reflective surface 21a of the first light guide member 21 to the second reflective surface 21b of the first light guide member 21, reflected perpendicularly by the second reflective surface 21b of the first light guide member 21 to the second reflective surface 25b of the third light guide member 25, reflected perpendicularly by the second reflective surface 25b of the third light guide member 25 to the first reflective surface 25a of the third light guide member 25, reflected perpendicularly by the first reflective surface 25a of the third light guide member 25 to the light receiving elements 17, and received by the light receiving elements 17. As a result, an optical matrix M comprising a plurality of optical paths is generated over the surface of the touch panel 9 when the light is transmitted over the surface of the touch panel 9. When the user touches the character or the icon displayed on the touch panel 9 as shown by an arrow F, the light at a touch point where the touch panel 9 is touched is blocked. Then, due to change in the intensity of the light received by the light receiving elements 17, the location of the touch point on the touch panel is identified by a control system comprising a processor which is integrated into the printed circuit assembly 3. The electrical or electronic apparatus comprising the touch screen assembly thus performs the function corresponding to the character or the icon.

Figure 7:
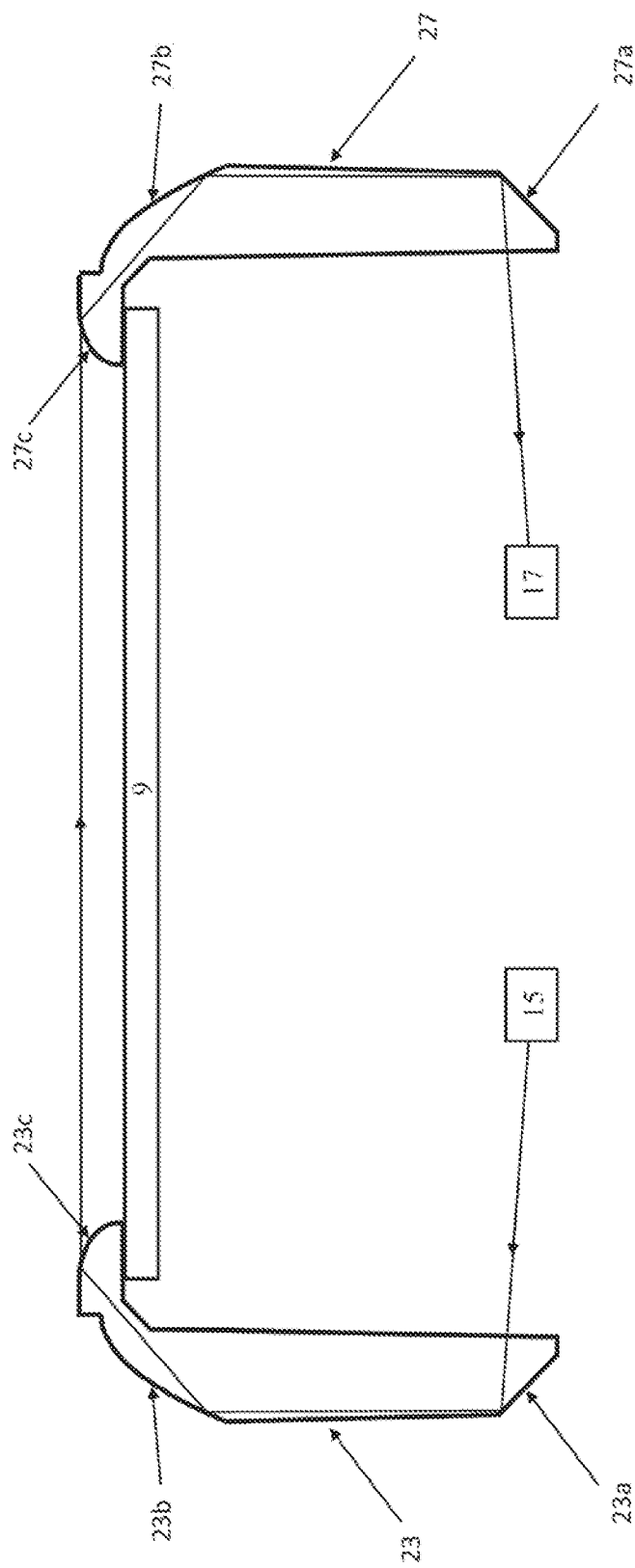
FIG. 7 is a simplified view similar to FIG. 5 showing schematically another optical path of the light in the infrared touch screen assembly.

FIG. 7 is a simplified view similar to FIG. 5 showing schematically another optical path of the light in the infrared touch screen assembly. In the example shown in FIG. 7, besides the first reflective surface and the second reflective surface, each of the first light guide members 21, the second light guide members 23, the third light guide members 25 and the fourth light guide members 27 further comprise a third refractive surface formed adjacent the second reflective surface on a top side of the frame. For example, the second light guide members 23 comprise a third refractive surface 23c formed adjacent the second reflective surface 23b on a top side of the frame and the fourth light guide members 27 comprise a third refractive surface 27c formed adjacent the second reflective surface 27b on a top side of the frame. The third refractive surface may be an elliptical surface. And, the second reflective surface and the third refractive surface may share a common focal point to ensure that the light is properly reflected. The incoming light emitted by the emitting elements 15 is projected onto the first reflective surface 23a of the second light guide member 23, reflected by the first reflective surface 23a of the second light guide member 23 to the second reflective surface 23b of the second light guide member 23, reflected by the second reflective surface 23b of the second light guide member 23 to the third refractive surface 23c of the second light guide member 23, refracted by the third refractive surface 23c of the second light guide member 23 to the third refractive surface 27c of the fourth light guide member 27, refracted by the third refractive surface 27c of the fourth light guide member 27 to the second reflective surface 27b of the fourth light guide member 27, reflected by the second reflective surface 27b of the fourth light guide member 27 to the first reflective surface 27a of the fourth light guide member 27, reflected by the first reflective surface 27a of the fourth light guide member 27 to the light receiving elements 17 and received by the light receiving elements 17. Similarly, the incoming light projected onto the first light guide member 21 and the third light guide member 25 is reflected and refracted in a way similar to the second light guide member 21 and the fourth light guide member 25. In the example shown in FIG. 7, the incoming light projected onto each of the four light guide members is non-perpendicularly reflected or refracted relative to the incident direction of the incoming light. It should be understand that each of the light guide members may comprises more than two reflective surfaces and more than one refractive surface.

The light guide 5 according to the example of the present disclosure is formed as the single piece unit. The single piece light guide is less prone warpage due to the mechanical stability and generates the seamless optical paths. Thus, it is possible for the touch screen assembly according to the present disclosure to, for example, increase the reliability, minimize troubleshooting efforts and drive down the cost.

While the disclosure has been illustrated and described in detail in the drawings and foregoing description, such illustration and description are to be considered illustrative and not restrictive. The disclosure is not limited to the disclosed examples. Other variations to the disclosed examples can be understood and effected in practicing a claimed disclosure, from a study of the drawings, the disclosure, and the dependent claims.

In the claims, the word "comprising" does not exclude other elements, and the indefinite article "a" or "an" does not exclude a plurality. The mere fact that certain measures are re-cited in mutually different dependent claims does not indicate that a combination of these measures cannot be used. Any reference signs in the claims should not be construed as limiting the scope.

The invention claimed is:

1. A light guide comprising:
   a frame defining a central space;
   a first reflective surface formed on a bottom side of the frame; and
   a second reflective surface formed on a top side of the frame, wherein light from a plurality of light emitting elements, reflected by the first reflective surface and the second reflective surface, is received by a plurality of light receiving elements, wherein each light emitting element is disposed on a first side of a circuit board and is paired with a light receiving element disposed on a second side of the circuit, the second side of the circuit board opposite the first side of the circuit board, wherein the light is to form an optical matrix within the central space.

2. The light guide according to claim 1, wherein the first reflective surface comprises a first reflective surface formed on a bottom side of the frame, the second reflective surface comprises a second reflective surface formed on a top side of the frame, and the first reflective surface and the second reflective surface perpendicularly reflect an incoming light relative to an incident direction of the incoming light.

3. The light guide according to claim 2, wherein the first reflective surface is an off-axis parabolic surface, and the second reflective surface is a parabolic surface.

4. The light guide according to claim 1, wherein the first reflective surface comprises a first reflective surface formed on a bottom side of the frame, the second reflective surface comprises a second reflective surface formed on a top side of the frame, the light guide further comprises a third refractive surface formed adjacent the second reflective surface on the top side of the frame, and the first reflective surface and the second reflective surface non-perpendicularly reflect an incoming light relative to an incident direction of the incoming light.

5. The light guide according to claim 4, wherein the first reflective surface is an off-axis parabolic surface, the second reflective surface is a parabolic surface and the third refractive surface is an elliptical surface.

6. The light guide according to claim 5, wherein the second reflective surface and the third refractive surface share a common focal point.

7. The light guide according to claim 1, wherein the first reflective surface and the second reflective surface are a flat surface, a faceted surface or a curved surface.

8. The light guide according to claim 4, wherein the first reflective surface, the second reflective surface and the third refractive surface are a flat surface, a faceted surface or a curved surface.

9. The light guide according to claim 1, wherein the light guide is integrally molded to form a single piece unit.

10. The light guide according to claim 1, wherein the light guide further comprises a projection extending from the frame toward the central space to form a support platform.

11. The light guide according to claim 10, wherein the light guide further comprises a generally L-shaped arm overhanging from the projection.

12. The light guide according to claim 10, wherein a plurality of cavities are provided at the support platform to receive the mechanical components therein.

13. The light guide according to claim 10, wherein ribs are formed on a bottom surface of the support platform.

14. The light guide according to claim 10, wherein the support platform is molded integrally with the frame.

15. A touch screen assembly comprising:
a light guide defining a central space;
a printed circuit assembly comprising a printed circuit board, a plurality of light emitting elements, the light emitting elements disposed onto a first side of the printed circuit board, each light emitting element paired with one of a plurality of light receiving elements, the light receiving elements disposed onto a second side of the printed circuit board, the second side of the printed circuit board opposite the first side of the printed circuit board, and the printed circuit assembly being attached to a bottom side of the light guide wherein light from the plurality of light emitting elements directed through the light guide to the plurality of light receiving elements is to form a light matrix within the central space;
a color and graphics display disposed within the central space of the light guide and above the printed circuit assembly;
a touch panel disposed within the central space of the light guide and above the color and graphics display; and
a bezel holding the printed circuit assembly, the light guide, the color and graphics display and the touch panel in place.

16. The touch screen assembly according to claim 15, wherein the light emitting elements are infrared light emitting diode, the light receiving elements are photodiodes, and the touch screen assembly is an infrared touch screen assembly.

17. The touch screen assembly according to claim 15, wherein the touch screen assembly further comprises a frame light pipe received in a cavity of a support platform of the light guide.

18. The touch screen assembly according to claim 15, wherein the touch screen assembly further comprises a WIFI light pipe received in a cavity of a support platform of the light guide.

* * * * *